US012155143B2

(12) United States Patent
Chang et al.

(10) Patent No.: US 12,155,143 B2
(45) Date of Patent: Nov. 26, 2024

(54) CURRENT TRANSMISSION ASSEMBLY AND CURRENT TRANSMISSION SYSTEM

(71) Applicants: Bellwether Electronic (Kunshan) Co., Ltd, Kunshan (CN); BELLWETHER ELECTRONIC CORP., Taoyuan (TW)

(72) Inventors: Ching-Hsiang Chang, Taoyuan (TW); Xiang-Biao Tang, Kunshan (CN); Yen-Lin Chen, Taoyuan (TW)

(73) Assignees: Bellwether Electronic (Kunshan) Co., Ltd, Kunshan (CN); BELLWETHER ELECTRONIC CORP., Taoyuan (TW)

( * ) Notice: Subject to any disclaimer, the term of this patent is extended or adjusted under 35 U.S.C. 154(b) by 0 days.

(21) Appl. No.: 18/415,582

(22) Filed: Jan. 17, 2024

(65) Prior Publication Data

US 2024/0195103 A1 Jun. 13, 2024

Related U.S. Application Data

(63) Continuation of application No. 17/460,322, filed on Aug. 30, 2021, now Pat. No. 11,888,252.

(30) Foreign Application Priority Data

Mar. 8, 2021 (CN) ......................... 202110251146.3

(51) Int. Cl.
*H01R 13/11* (2006.01)
*H01R 4/02* (2006.01)
(Continued)

(52) U.S. Cl.
CPC ........... *H01R 13/111* (2013.01); *H01R 4/023* (2013.01); *H01R 13/113* (2013.01);
(Continued)

(58) Field of Classification Search
CPC ...... H01R 13/111; H01R 4/023; H01R 13/113
(Continued)

(56) References Cited

U.S. PATENT DOCUMENTS 1,635,351 A * 7/1927 Spurgeon ............. H01R 11/284 439/465
5,338,898 A * 8/1994 Luciano ............... H01R 13/501 439/892
(Continued)

FOREIGN PATENT DOCUMENTS

CN 105830284 A 8/2016
CN 106571549 A 4/2017
(Continued)

*Primary Examiner* — Neil Abrams
(74) *Attorney, Agent, or Firm* — Li & Cai Intellectual Property Office

(57) ABSTRACT

A current transmission assembly and a current transmission system are provided. The current transmission system includes the current transmission assembly and a circuit board structure. The current transmission assembly includes a pluggable component, at least one conductor component, and at least one electrically connecting component. The pluggable component includes a housing, at least one set of electrically conductive arms, and at least one connecting member. The at least one sets of electrically conductive arms is disposed inside the housing. The at least one conductor component includes an electrical insulator and a wire main body. The electrical insulator encircles the wire main body, so that a first terminal and a second terminal are exposed from the wire main body, and the first terminal is connected to the at least one two connecting member.

11 Claims, 10 Drawing Sheets

(51) Int. Cl.

| | |
|---|---|
| ***H01R 13/24*** | (2006.01) |
| ***H01R 13/506*** | (2006.01) |
| ***H01R 13/518*** | (2006.01) |

(52) U.S. Cl.
CPC ....... *H01R 13/2492* (2013.01); *H01R 13/506* (2013.01); *H01R 13/518* (2013.01)

(58) Field of Classification Search
USPC .......................................................... 439/883
See application file for complete search history.

(56) References Cited

U.S. PATENT DOCUMENTS

| | | | | | |
|---|---|---|---|---|---|
| 5,442,138 | A * | 8/1995 | Ochi | H01R 4/70 | 439/892 |
| 6,984,148 | B1 * | 1/2006 | Nanda | H01R 11/282 | 439/892 |
| 7,530,843 | B1 * | 5/2009 | Tesfay | H01R 13/521 | 439/587 |
| 10,050,395 | B2 * | 8/2018 | Ngo | H01R 13/6275 | |
| 11,888,252 | B2 * | 1/2024 | Chang | H01R 11/05 | |

FOREIGN PATENT DOCUMENTS

| | | | |
|---|---|---|---|
| CN | 214542580 | U | 10/2021 |
| WO | WO2015085166 | A1 | 6/2015 |

* cited by examiner

CURRENT TRANSMISSION ASSEMBLY AND CURRENT TRANSMISSION SYSTEM

CROSS-REFERENCE TO RELATED PATENT APPLICATION

This application is a Continuation of U.S. patent application Ser. No. 17/460,322 filed Aug. 30, 2021 entitled CURRENT TRANSMISSION ASSEMBLY AND CURRENT TRANSMISSION SYSTEM, which claims the benefit of priority to China Patent Application No. 202110251146.3, filed on Mar. 8, 2021 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a current transmission assembly and a current transmission system, and more particularly to a current transmission assembly and a current transmission system for high current transmission.

BACKGROUND OF THE DISCLOSURE

Generally, a current carrying capacity of a current transmission assembly is related to a terminal structure. A maximum current that can be carried by the terminal structure of conventional current transmission assemblies is related to a design of the terminal structure and a size of a cross-sectional area thereof. With an increasing demand for electricity in products, there are also demands for a higher maximum current that can be carried by the terminals, and the current transmission assemblies in the conventional technique have gradually become insufficient.

Therefore, how to improve the terminal structure of the current transmission assembly through improvements to structural design, so as to further increase the current that can be carried, has become one of the important issues to be solved in the related art.

SUMMARY OF THE DISCLOSURE

In response to the above-referenced technical inadequacy, the present disclosure provides a current transmission assembly and a current transmission system.

In one aspect, the present disclosure provides a current transmission assembly, which comprises a pluggable component, at least one conductor component, and at least one electrically connecting component. The pluggable component includes a housing, at least one set of electrically conductive arms, and at least one connecting member, the at least one set of electrically conductive arms is disposed inside the housing and having two contact terminals arranged opposite to each other to form an interface, and the at least one connecting member is electrically connected to at least one of the two contact terminals. The at least one conductor component includes a first electrical insulator and a wire main body, the wire main body includes a plurality of electrically conductive fibers, wherein the first electrical insulator encircles the wire main body, a first terminal and a second terminal of the wire main body are exposed from the wire main body, and the first terminal is connected to the at least one connecting member. The at least one electrically connecting component includes an electrically conductive main body and a second electrical insulator. The second electrical insulator has a chamber therein. At least one part of the electrically conductive main body is inserted and fixed in the chamber of the second electrical insulator. Wherein, the electrically conductive main body including a connecting portion, and a first through hole, the second electrical insulator has a second through hole corresponding to the first through hole, and the second terminal of the wire main body is fixed on the connecting portion.

In another aspect, the present disclosure provides a current transmission system, which includes a pluggable component, at least one conductor component, at least one first electrically connecting component, and at least one second electrically connecting component. The pluggable component includes a housing, at least one set of electrically conductive arms, and at least one connecting member, the at least one set of electrically conductive arms is disposed inside the housing and having two contact terminals arranged opposite to each other to form an interface, and the at least one connecting member is electrically connected to at least one of the two contact terminals. The at least one conductor component includes a first electrical insulator and a wire main body, and the wire main body includes a plurality of electrically conductive fibers, wherein the first electrical insulator encircles the wire main body, a first terminal and a second terminal of the wire main body are exposed from the wire main body, and the first terminal is connected to the at least one connecting member. The at least one first electrically connecting component is connected to the second terminal of the wire main body, wherein each of the first electrically connecting component includes an electrically conductive main body, and the electrically conductive main body includes a connecting portion and a first through hole. The at least one second electrically connecting component is electrically connected to a circuit board structure, the at least one second electrically connecting components includes a plug-type terminal being detachably connected to the electrically conductive main body. Wherein the at least one first electrically connecting components further includes a second electrical insulator, the second electrical insulator has a chamber therein and a second through hole, the second through hole being communicated with the chamber and corresponding to the first through hole, and the plug-type terminal is inserted in the electrically conductive main body through the first through hole and the second through hole for electrically connected with each other.

Therefore, one of the beneficial effects of the present disclosure is that a current carrying capacity of the current transmission assembly provided by the present disclosure can be increased, by virtue of "the electrically conductive main body including the connecting portion and the through hole being cylinder shaped or a groove, the connecting portion being disposed on the side wall of the electrically conductive main body, and the second terminal of the wire main body being fixed to the connecting portion."

Another one of the beneficial effects of the present disclosure is that a current carrying capacity of the current transmission system provided by the present disclosure can be increased, by virtue of "one of each of the first electrically connecting components and each of the second electrically connecting components including the electrically conductive main body, the electrically conductive main body including the connecting portion, and the through hole being cylinder shaped or the groove, the second terminal of the wire main body being fixed to the connecting portion, and another one of each of the first electrically connecting components U1 and each of the second electrically connecting components M1 including at least one plug-type terminal".

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
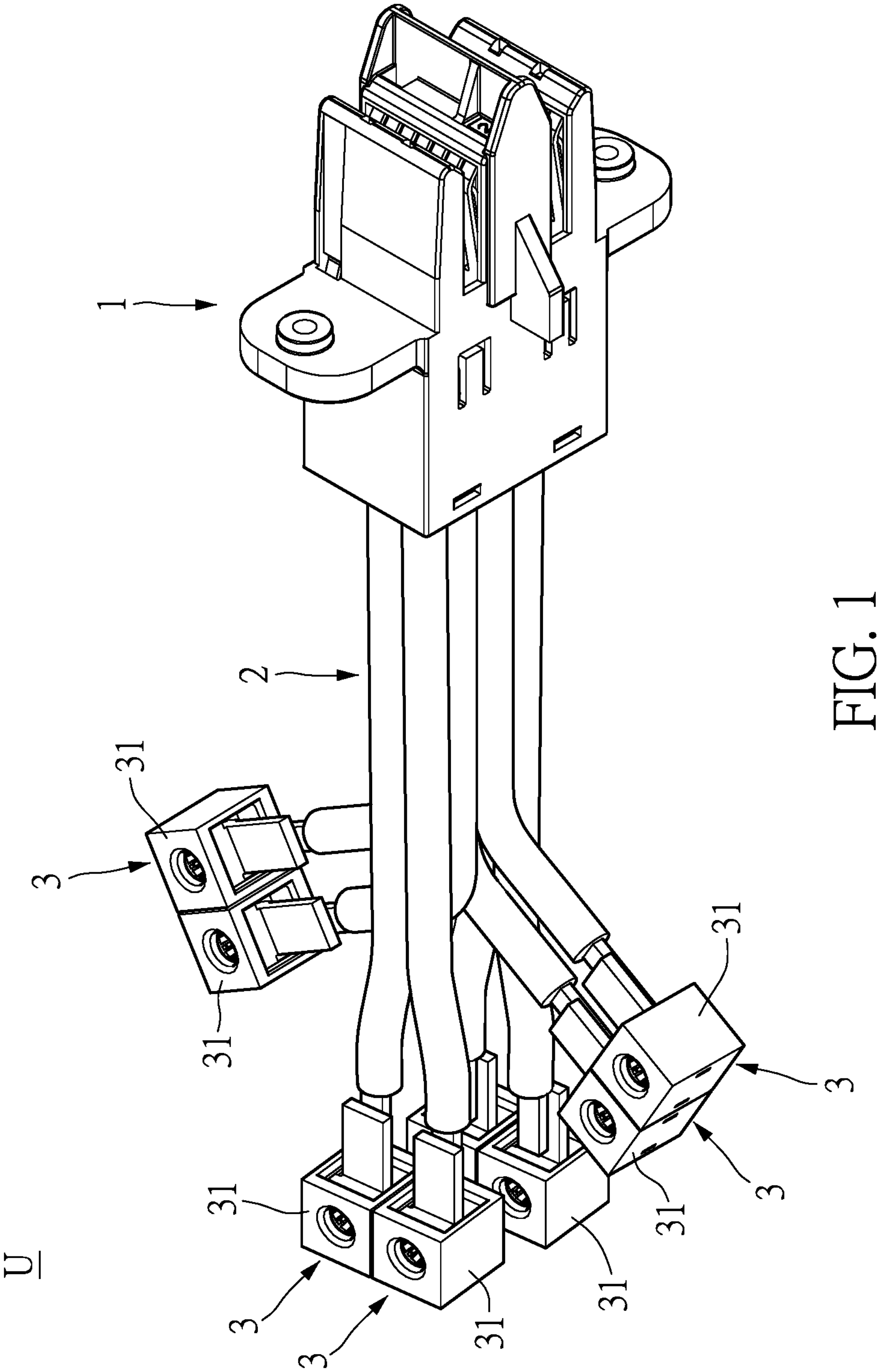
FIG. 1 is a schematic perspective view of a current transmission assembly according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
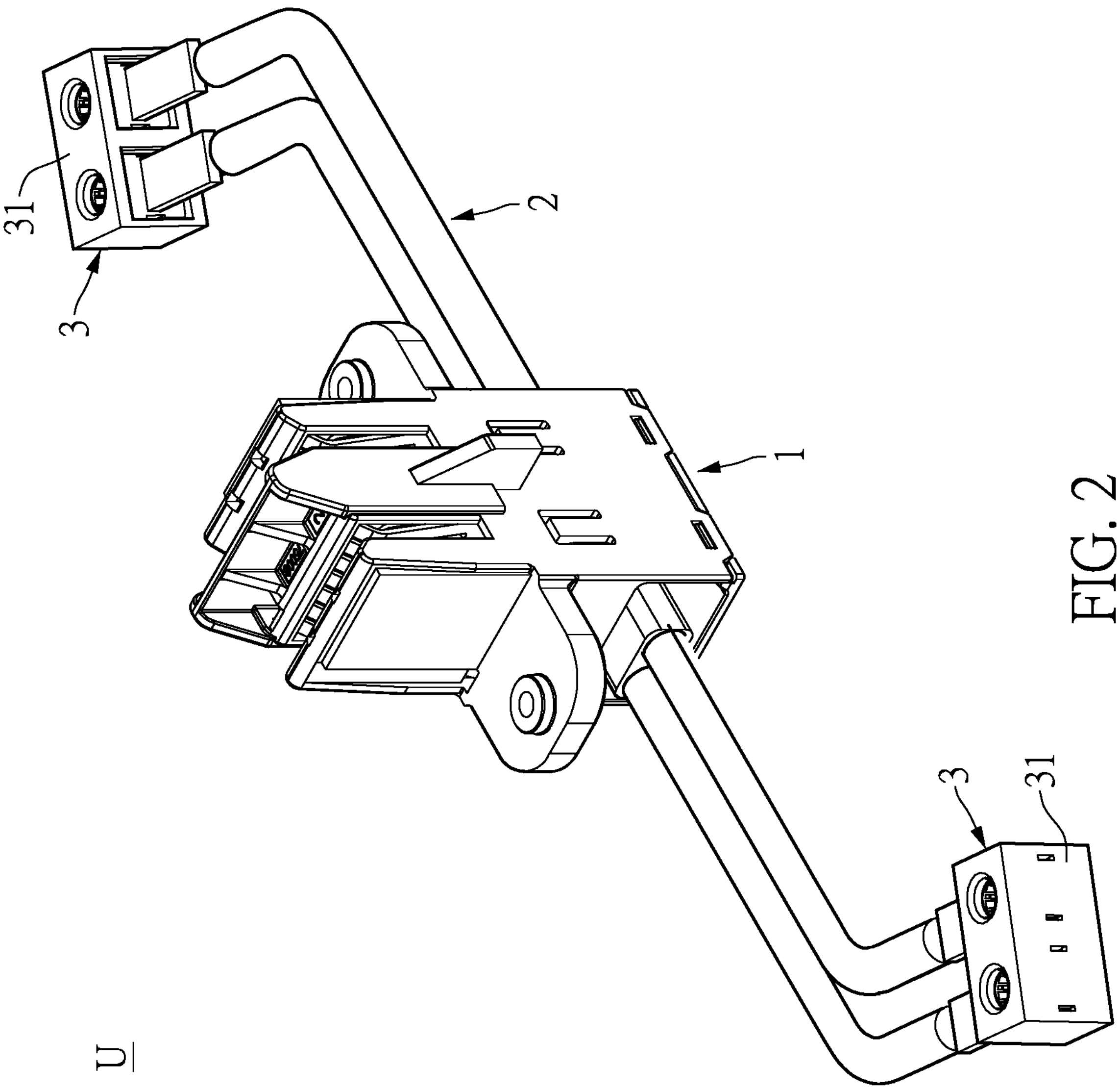
FIG. 2 is a schematic perspective view of the current transmission assembly according to another embodiment of the present disclosure.

Referring to FIG. 1, a first embodiment of the present disclosure provides a current transmission assembly U, which can be applied in a power distribution architecture of a data center. The current transmission assembly U includes a pluggable component 1, at least one conductor component 2, and at least one electrically connecting component 3. It is worth mentioning that the current transmission assembly U shown in FIG. 1 is a current transmission structure that extends in one direction, but the present disclosure is not limited thereto. For example, the current transmission assembly U can also be a current transmission structure that extends bilaterally as shown in FIG. 2. In addition, it should be noted that, in the present disclosure, one of the electrically connecting component 3 can correspond to one or more of the conductor components 2 at the same time, or one of the conductor components 2 can correspond to one or more of the electrically connecting components 3 at the same time. The present disclosure is not limited by a number of the conductor components 2 and a number of the electrically connecting components 3. For example, the current transmission assembly U may include two of the conductor components 2 and two of the electrically connecting components 3. The current transmission assembly U may include four of the conductor components 2 and four of the electrically connecting components 3. The current transmission assembly U may include eight of the conductor components 2 and eight of the electrically connecting components 3. The current transmission assembly U may also include unequal numbers of the conductor components 2 and the electrically connecting components 3. For the sake of illustration, the same numbers of the conductor components 2 and the electrically connecting components 3 are used as examples in the present embodiment.

Figure 3:
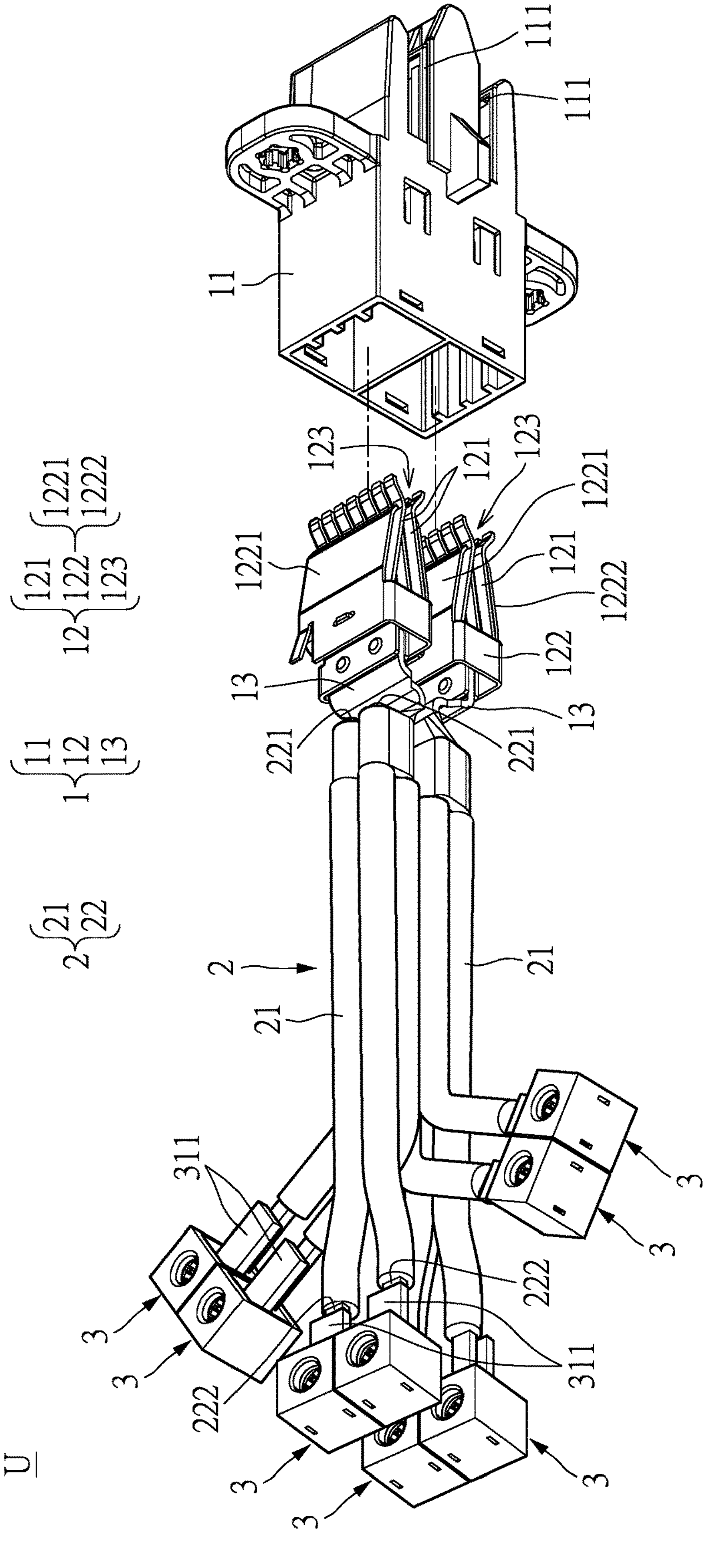
FIG. 3 is a schematic exploded view of a pluggable component and a conductor component of the current transmission assembly according to the present disclosure.

Referring to FIG. 3, FIG. 3 is a schematic exploded view of a pluggable component and a conductor component of the current transmission assembly according to the present disclosure. The pluggable component 1 is a bus bar clip terminal structure, which mainly includes a housing 11, two sets of electrically conductive arms 12, and two connecting members 13. The two sets of electrically conductive arms 12 are disposed inside the housing 11, and preferably the two connecting members 13 are also disposed inside the housing 11. The housing 11 includes two sockets 111, and each of the two sets of electrically conductive arms 12 includes two contact terminals 121. In the present embodiment, each of the two sets of electrically conductive arms 12 further includes a pressing elastic assembly 122, and the pressing elastic assembly 122 includes two resilient tabs 1221, 1222. The two resilient tabs 1221, 1222 are arranged opposite and connected to each other, and the pressing elastic assembly 122 can generate a pressing force. The pressing elastic assembly 122 that is formed by a combination of the two resilient tabs 1221, 1222 surrounds the two contact terminals 121, such that the two contact terminals 121 are arranged between the two resilient tabs 1221, 1222. The two contact terminals 121 are arranged oppositely to each other to form an interface 123. When the two sets of electrically conductive arms 12 are disposed inside the housing 11, each of the two sockets 111 respectively corresponds to each of the interfaces 123, so that the each of the two sockets 111 is respectively communicated with the each of the interfaces 123. In addition, in the present embodiment, each of the two connecting members 13 is respectively connected to one side of each of the two sets of electrically conductive arms 12 that is the side opposite to the interface 123. When an external terminal passes through the socket 111 and is inserted into the interface 123, the two contact terminals 121 are pushed out and then the pressing force generated by the pressing assembly 122 compresses the two contact terminals 121 to increase a positive force of the two contact terminals 121 on the external terminal, such that the external terminal is not easily detached from the interface 123.

Figure 8:
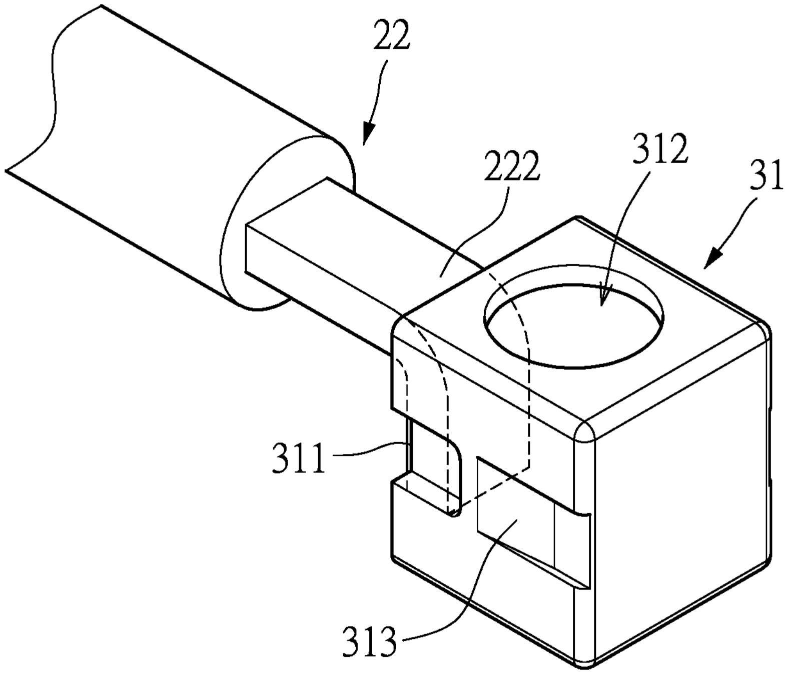
FIG. 8 is a schematic view of a wire main body and a connecting portion of the current transmission assembly according to one embodiment of the present disclosure.
Figure 9:
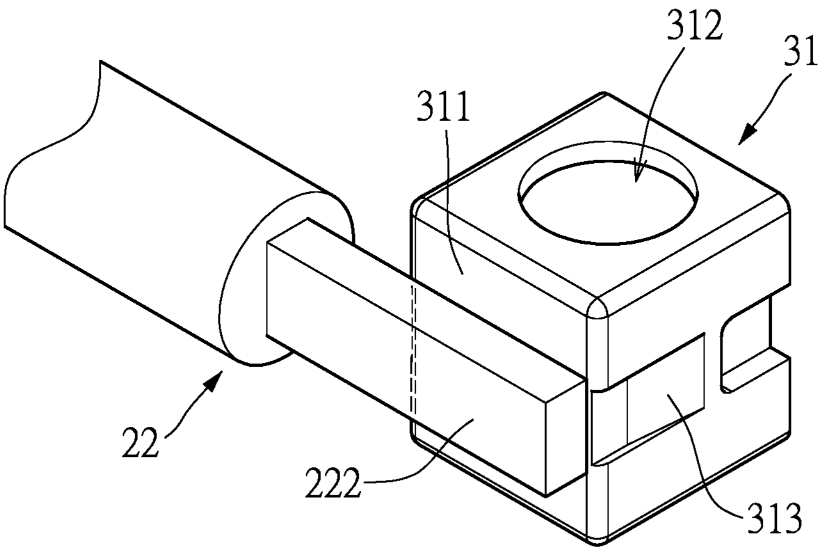
FIG. 9 is a schematic view of the wire main body and the connecting portion of the current transmission assembly according to another embodiment of the present disclosure.
Figure 10:
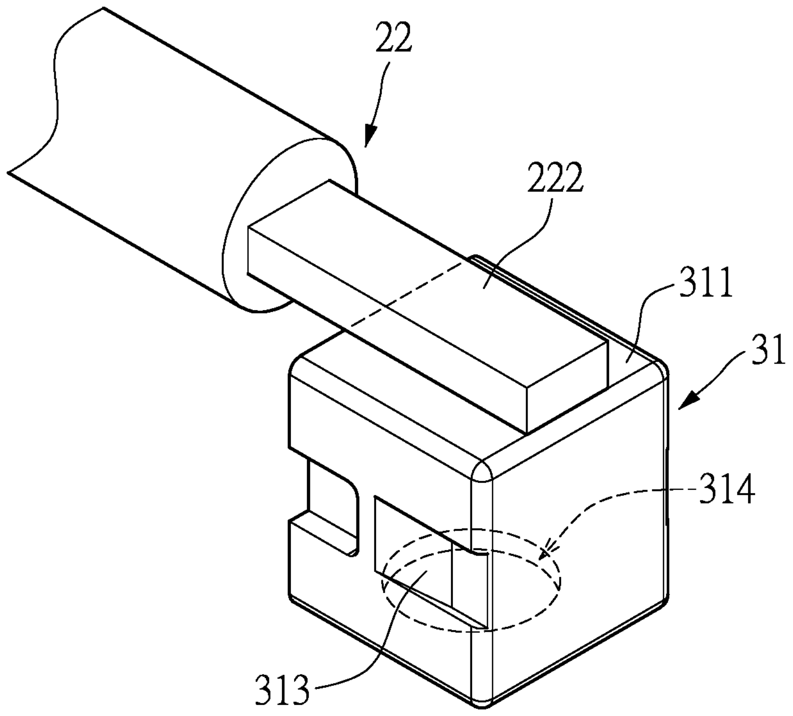
FIG. 10 is a schematic view of a wire main body and a connecting portion of the current transmission assembly according to yet another embodiment of the present disclosure.

Referring further to FIG. 3, each of the conductive components 2 includes a first electrical insulator 21 and a wire main body 22. In the present disclosure, the first electrical insulator 21 encircles the wire main body 22, such that the wire main body 22 is not shown in FIG. 3. Specifically speaking, the first electrical insulator 21 is like an outer insulating film that covers the wire main body 22. Referring to FIG. 8 to FIG. 10, a part of the wire main body 22 that is not encircled by the first electrical insulator 21 is shown. Moreover, the wire main body 22 includes a first terminal 221 and a second terminal 222. The first electrical insulator 21 encircles the wire main body 22, so that the first terminal 221 and the second terminal 222 are exposed from the wire main body 22, and the first terminal 221 of the wire main body 22 is connected to one of the two connecting members 13 of the pluggable component 1. The first terminal 221 of the wire main body 22 is connected to the connecting member 13 of the pluggable component 1 by ultrasonic welding, riveting, soldering, or threadedly engaging, but the present disclosure is not limited thereto. It is worth mentioning that, in one embodiment of the present disclosure, the wire main body 22 as a current transmission medium mainly includes a plurality of electrically conductive fibers that are made of copper, but the present disclosure is not limited thereto. For example, if the wire main body 22 includes the plurality of electrically conductive fibers that are made of copper, the plurality of electrically conductive fibers are not entirely encircled by the first electrical insulator 21 and one end terminal that is exposed (i.e., the second terminal 222) can be directly put on a connecting portion 311 of the electrically connecting component 3 (a specific structure of the electrically connecting component 3 will be described in further detail below), and then the one end terminal is fixed to the connecting portion 311 by ultrasonic welding or soldering. Therefore, the one end terminals of the plurality of electrically conductive fibers are not only fixed to the connecting portion 311, but at least one part thereof are also fused to each other, that is, the second terminals 222 of the plurality of electrically conductive fibers are fused to each other by melting or by molten tin treatment.

Figure 4:
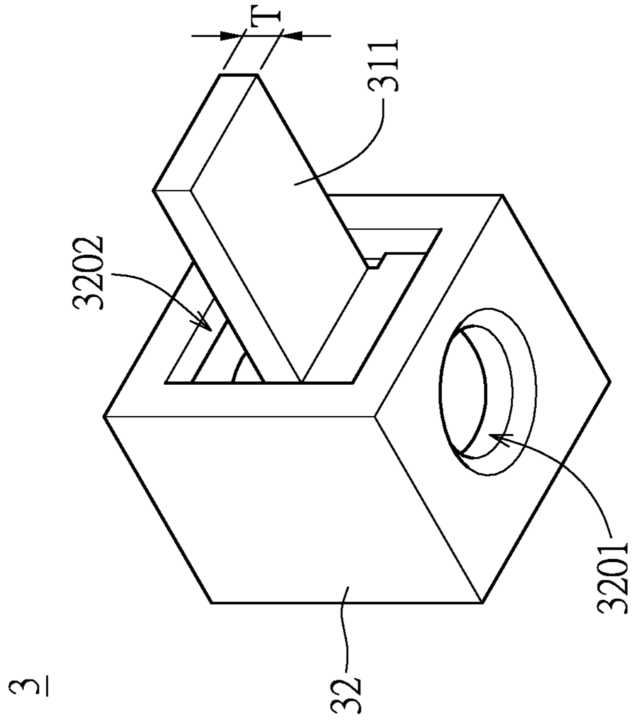
FIG. 4 is a schematic perspective view of an electrically connecting component of the current transmission assembly according to the present disclosure.
Figure 5:
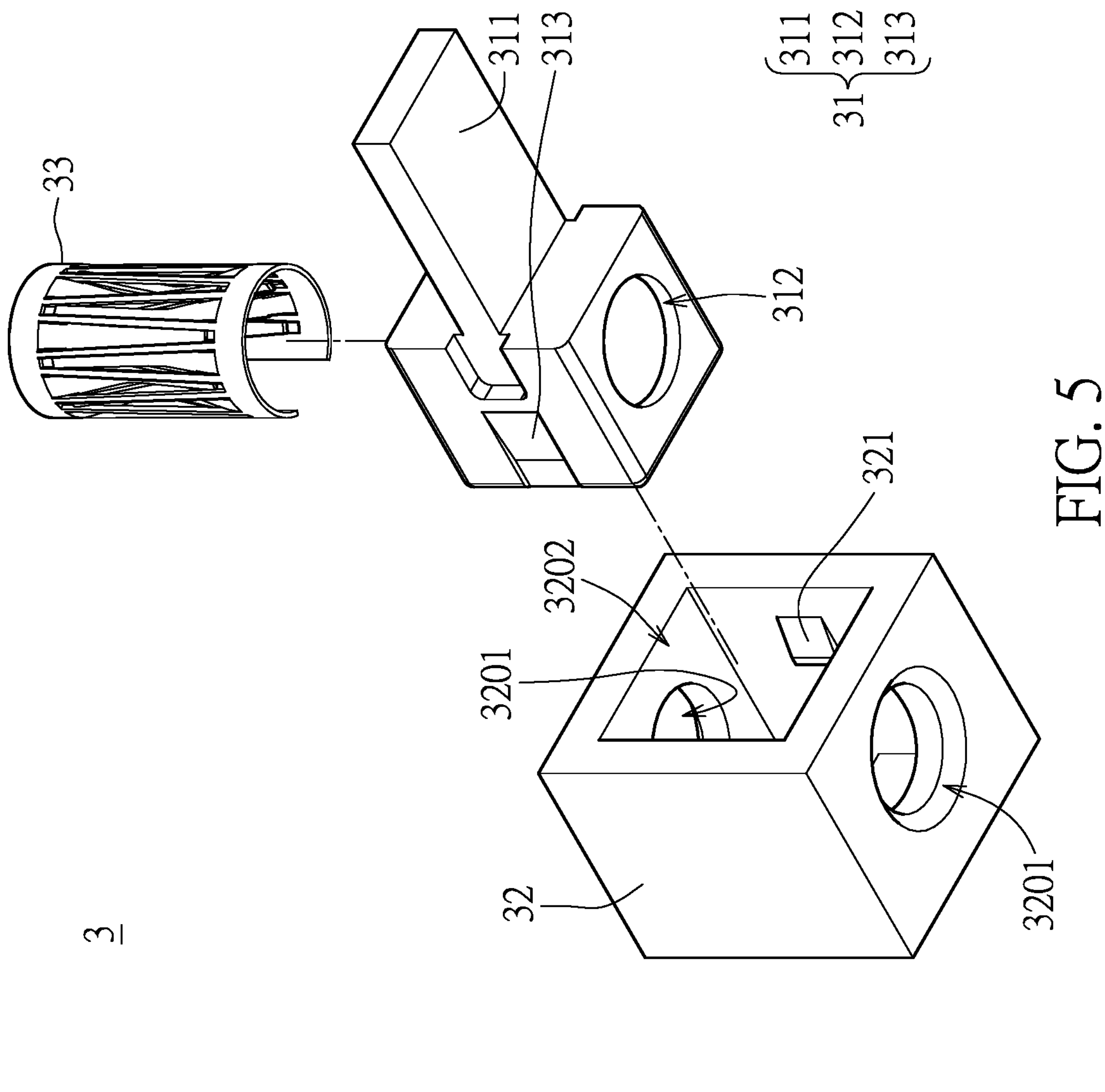
FIG. 5 is a schematic exploded view of the electrically connecting component of the current transmission assembly according to the present disclosure.
Figure 6:
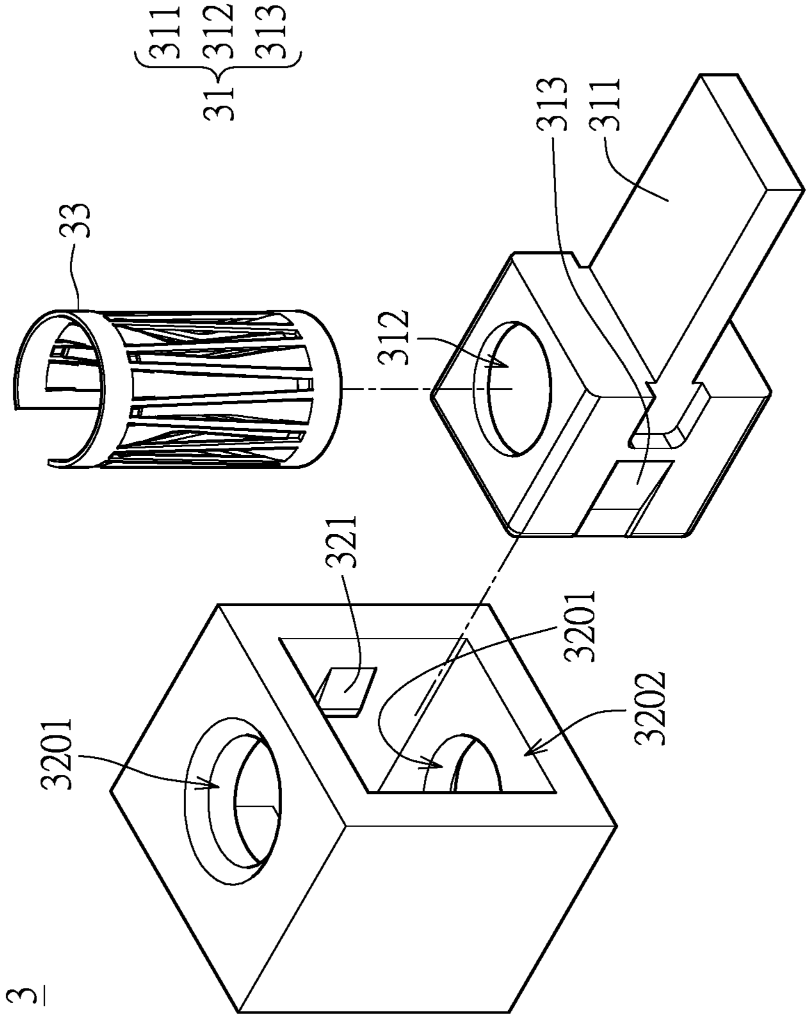
FIG. 6 shows a schematic exploded view of another view of the electrically connecting component of the current transmission assembly according to the present disclosure.
Figure 11:
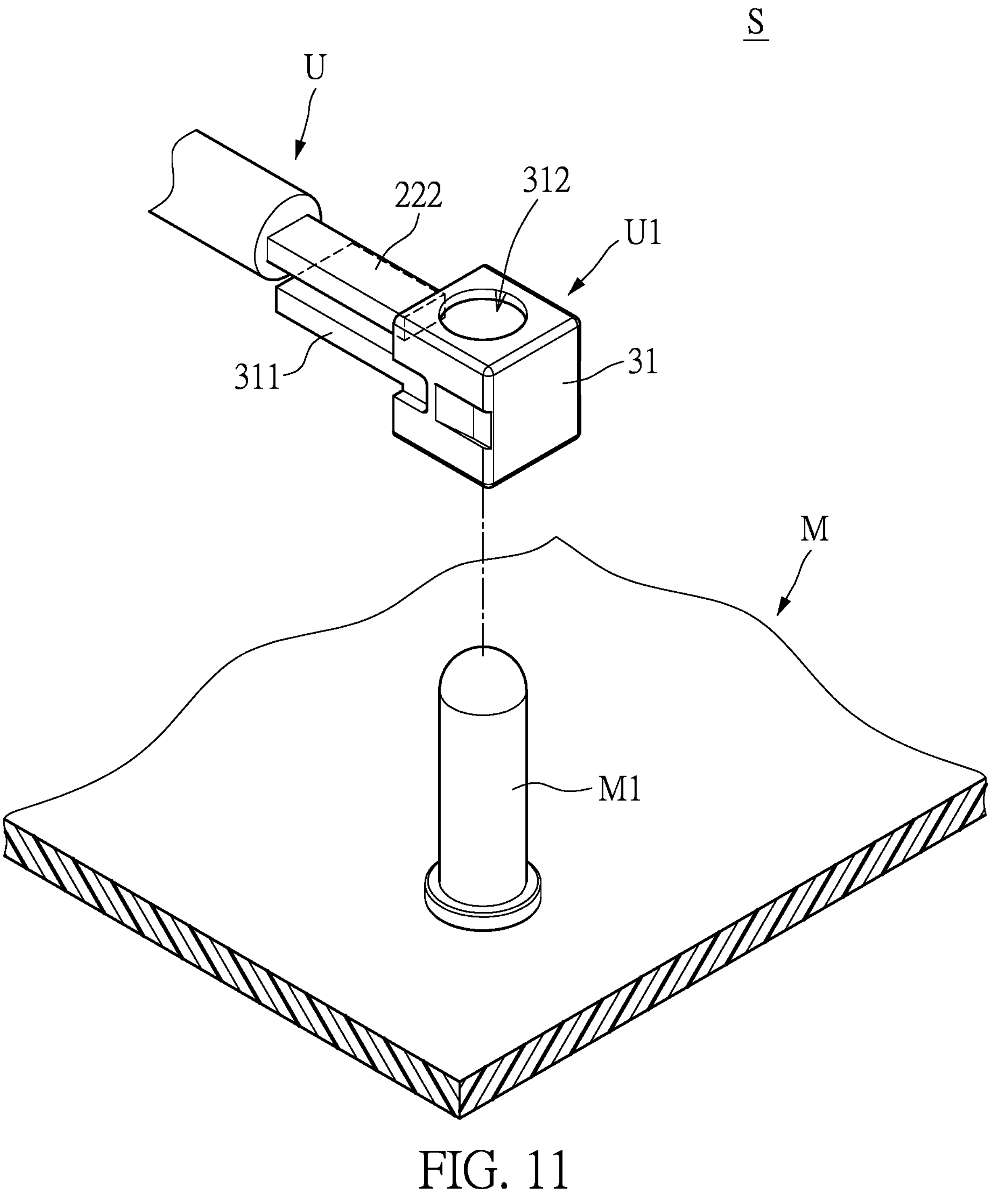
FIG. 11 is a schematic view of the current transmission assembly and a circuit board structure according to the present disclosure.

Referring to FIG. 4 to FIG. 6, the structure of the electrically connecting component 3 is described as follows. The electrically connecting component 3 is mainly a socket terminal, which includes an electrically conductive main body 31. The electrically conductive main body 31 includes the connecting portion 311 and a first through hole 312. The first through hole 312 passes through both terminal surfaces of the electrically conductive main body 31, and the first through hole 312 is preferably cylinder-shaped. As mentioned in the previous paragraph, the second terminal 222 of the wire main body 22 is fixed to the connecting portion 311 (as shown in FIG. 3). For example, the electrically conductive main body 31 is a rectangular body, and the connecting portion 311 is disposed on a side wall of the electrically conductive body 31, or rather, the connecting portion 311 is a plate-like structure extending perpendicularly to the side wall of the electrically conductive main body 31 and has a thickness T (as shown in FIG. 4). Furthermore, the connecting portion 311 (the plate-like structure) extends in a direction perpendicular to a direction in which the first through hole 312 extends, and an engagement surface (i.e., a surface on the connecting portion 311 which is used to contact the second terminal 222 of the wire main body 22) can be defined by the connecting portion 311. In addition, considering that a maximum current required for an application of the electrically connecting component 3 is 100 A or more, a preferred range of the thickness T can be 0.5 mm or more, preferably between 0.5 mm and 4.0 mm. Therefore, the current transmission assembly U having the electrically connecting component 3 is capable of carrying a current of 100 A or more. It is worth mentioning that, in the present embodiment, the electrically conductive main body 31 and the connecting portion 311 are integrally formed, but the present disclosure is not limited thereto. The present disclosure in not limited by a shape of the connecting portion 311, and a connection method, a connection direction, and a connection angle between the connecting portion 311 and the electrically conductive main body 31. In addition, the above-mentioned first through hole 312 can also be replaced by a groove structure (i.e., not passing through both the terminal surfaces of the electrically conductive main body 31), such that a connection to a second electrically connecting component M1 (as shown in FIG. 11) can be achieved. For the sake of convenience, the following is still an example of the through hole.

Referring again to FIG. 3, in the present embodiment, the second terminal 222 of the wire main body 22 is fixed on the connecting portion 311 by ultrasonic welding or by soldering, and the first terminal 221 of the wire main body 22 can be fixed to the connecting member 13 of the pluggable component 1 by ultrasonic welding, but the present disclosure is not limited thereto. However, it should be noted that, the way in which the second terminal 222 of the wire main body 22 is fixed on the connecting portion 311 does not include crimping. In addition, the wire main body 22 includes the electrically conductive fibers, but the present disclosure is not limited thereto.

Figure 7:
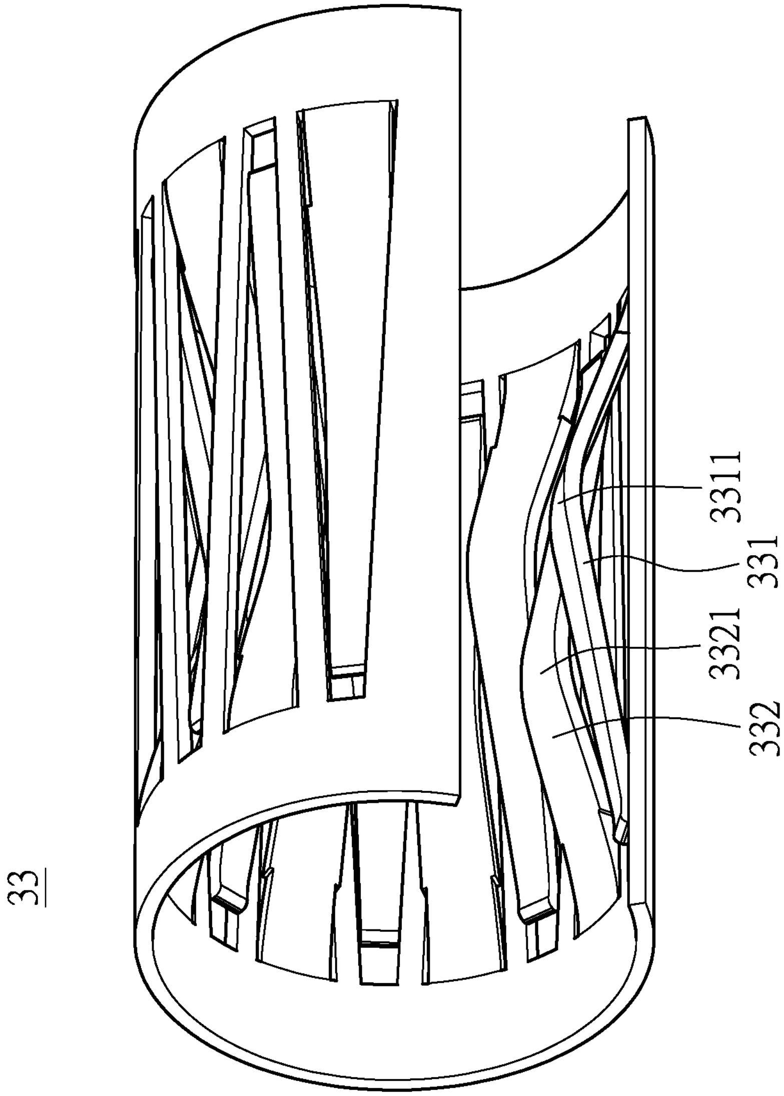
FIG. 7 is a schematic perspective view of a crown spring of the current transmission assembly according to the present disclosure.

Referring further to FIG. 4 to FIG. 6, which is to be read in conjunction with FIG. 7, each of the electrically connecting component 3 further includes a crown spring 33. Each of the crown springs 33 passes through the first through hole 312 and is disposed inside the electrically conductive main body 31. The crown spring 33 includes a plurality of cantilevers. In the present embodiment, the crown spring 33 includes a plurality of first cantilevers 331 and a plurality of second cantilevers 332. The plurality of first cantilevers 331 extend from one side of the crown spring 33 in a direction opposite to a direction in which the plurality of second cantilevers 332 extend from another side of the crown spring 33. Furthermore, a first contact segment 3311 is defined by each of the plurality of first cantilevers 331, and a second contact segment 3321 is defined by each of the plurality of second cantilevers 332. The first contact segment 3311 and the second contact segment 3321 that are adjacent to each other are arranged alternately. Therefore, when a user inserts a plug-type terminal (not shown in the figures) into one of the first through holes 312 of the electrically conductive main body 31, the user can insert the plug-type terminal into the crown spring 33 with less insertion force. The user can also pull out the plug-type terminal from the crown spring 33 with relatively less withdrawal force. In addition, through a design of arranging a plurality of first contact segments 3311 on an axis different from that on which a plurality of second contact segments 3321 are arranged, such the first contact segments 3311 and the second contact segments 3321 are located closer to the respective sides from which the first contact segments 3311 and the second contact segments 3321 extend (i.e., the aforementioned two sides of the crown spring 33). Accordingly, an occlusal force between the crown spring 33 and the plug-type terminal is increased, such that a safety of power transmission between the crown spring 33 and the plug-type terminal is improved, and a contact resistance between the crown spring 33 and the plug-type terminal can be reduced.

It is worth mentioning that, in the present embodiment, although the connecting portion 311 is the plate-like structure disposed on the side wall of the electrically conductive main body 31, the present disclosure is not limited thereto. In another embodiment, the connecting portion 311 can also be implemented in different ways. For example, referring to FIG. 8 to FIG. 10, instead of the plate-like structure extending perpendicularly to the side wall of the electrically conductive main body 31, the connecting portion 311 is the side wall of the electrically conductive main body 31 as shown in FIG. 8 to FIG. 10. Therefore, the second terminal 222 of the wire main body 22 being fixed to the connecting portion 311 refers to that the second terminal 222 of the wire main body 22 is directly connected to the side wall of the electrically conductive main body 31 by welding. FIG. 8 to FIG. 10 show implementations in which the second terminal 222 of the wire main body 22 is directly connected to the side wall of the electrically conductive main body 31 by welding. As shown in FIG. 8, the second terminal 222 of the wire main body 22 is a downwardly curved L-shaped structure that is directly connected to the connecting portion 311 (i.e., the side wall) of the electrically conductive main body 31 by welding. As shown in FIG. 9, the second terminal 222 of the wire main body 22 is a plate-like structure that extends in one direction and is directly connected to the connecting portion 311 (i.e., the side wall) of the electrically conductive main body 31 by welding. Further as shown in FIG. 10, the second terminal 222 of the wire main body 22 is also a plate-like structure that extends in one direction and is directly connected to the connecting portion 311 (i.e., the side wall) of the electrically conductive main body 31 by welding. In addition, another difference between FIG. 10 and FIG. 8 as well as FIG. 9 is that, in the embodiments of FIG. 8 and FIG. 9, the plug-type terminal is mated with the electrically conductive main body 31 through the first through hole 312, while, in the embodiment of FIG. 10, the groove structure instead of the through hole structure is disposed on the electrically conductive main body 31. That is to say, in the embodiment of FIG. 10, the crown spring 33 passes through a groove 314, and the plug-type terminal is mated with the electrically conductive main body 31 through the groove 314. It should be noted that, as shown in FIG. 8 to FIG. 10, although the second terminals 222 of the wire main bodies 22 are connected to the connecting portions 311 (i.e., the side wall) of the electrically conductive main bodies 31 by welding, it is apparent that the second terminals 222 of the wire main bodies 22 in FIG. 8 to FIG. 10 are connected to different side walls of the electrically conductive main bodies 31 by welding. In other words, a side wall position of the electrically conductive main body 31 on which the connecting portion 311 is arranged is not limited, and can be, for example, a side wall at one side of the electrically conductive main body 31 (as shown in FIG. 8 and FIG. 9), or a side wall at a top of the electrically conductive main body 31 (as shown in FIG. 10).

In addition, referring again to FIG. 4 to FIG. 6, the electrically connecting component 3 further includes a second electrical insulator 32. The crown spring 33 and a part of the electrically conductive main body 31 that correspondingly accommodates the crown spring 33 are disposed inside the second electrical insulator 32. The second electrical insulator 32 has at least one second through hole 3201 corresponding to the first through hole 312, and a slot 3202 in which the electrically conductive main body 31 can be disposed therein, so that the plug-type terminal can be first inserted into the second through hole 3201, then inserted into the first through hole 312, and finally be inserted into the crown spring 33, so as to be electrically connected to the crown spring 33.

The present disclosure is not limited by a number of the electrically conductive main bodies 31 that can be accommodated by the second electrical insulator 32. For example, as shown in FIG. 1, each of the second electrical insulators 32 accommodates one of the electrically conductive main bodies 31 having one of the first through holes 312, and each of the second electrical insulators 32 has the second through holes 3201 corresponding to the one of the first through holes 312. As shown in FIG. 2, each of the second electrical insulators 32 can accommodate two (or more) of the electrically conductive main bodies 31 each having one of the first through hole 312, and each of the second electrical insulators 32 has two of the second through holes 3201 corresponding to the two of the first through holes 312.

In addition, the electrically conductive main body 31 further includes at least one first fastener portion 313 disposed on one side of the electrically conductive main body 31. The second electrical insulator 32 includes at least one second fastener portion 321 corresponding to the at least one first fastener portion 313, and the at least one second fastener portion 321 is disposed on an inner wall of the second electrical insulator 32. When the electrically conductive main body 31 is disposed inside the second electrical insulator 32, the electrically conductive main body 31 can be fixed in the second electrical insulator 32 by engaging the first fastener portion 313 and the second fastener portion 321 together. It should be noted that the present disclosure is not limited to forms of the first fastener portion 313 and the second fastener portion 321.

Second Embodiment

Referring to FIG. 11, the present disclosure further provides a current transmission system S according to the current transmission assembly U described above. The current transmission system S includes a current transmission assembly U and a circuit board structure M.

Specifically speaking, the current transmission assembly U includes a pluggable component 1, at least one conductor component 2, and a first electrically connecting component U1. Specific structures of the pluggable component 1 and the conductor component 2 can be referred to FIG. 2 and FIG. 3. The pluggable component 1 is a busbar clip terminal structure, which mainly includes a housing 11, two sets of electrically conductive arms 12, and two connecting members 13. The two sets of electrically conductive arms 12 and the two connecting members 13 are both disposed inside the housing 11. The housing 11 includes two sockets 111, and each of the two sets of electrically conductive arms 12 includes two contact terminals 121 and a pressing elastic assembly 122 that surrounds the two contact terminals 121. The two contact terminals 121 are arranged oppositely to each other to form an interface 123. Each of the two sockets 111 respectively corresponds to each of the interfaces 123, so that each of the two sockets 111 is respectively communicated with each of the interfaces 123. Each of the two connecting members 13 is respectively connected to one side of each of the two sets of electrically conductive arms 12 that is another side opposite to the interface 123. Each of the conductor components 2 includes a first electrical insulator 21 and a wire main body 22. The wire main body 22 includes a first terminal 221 and a second terminal 222. The first electrical insulator 21 encircles the wire main body 22, so that the first terminal 221 and the second terminal 222 are exposed from the wire main body 22. The first terminal 221 of the wire main body 22 is connected to one of the two connecting members 13 of the pluggable component 1. In addition, the first electrically connecting component U1 is connected to the second terminal 222 of the wire main body 22.

The circuit board structure M includes a second electrically connecting component M1 that is electrically connected to the first electrically connecting component U1.

Moreover, one of each of the first electrically connecting components U1 and each of the second electrically connecting components M1 includes an electrically conductive main body 31. The electrically conductive main body 31 includes a connecting portion 311 and a first through hole 312. The second terminal 222 of the wire main body 22 is fixed on the connecting portion 311. Another one of each of the first electrically connecting components U1 and each of the second electrically connecting components M1 includes at least one plug-type terminal. The plug-type terminal can be detachably inserted in the first through hole 312 (or a groove 314), so that the first electrically connecting component U1 is electrically connected to the second electrically connecting component M1.

For example, in the present embodiment, the first electrically connecting component U1 is a socket terminal structure (the same as the electrically connecting component 3 in the first embodiment, and as shown in FIG. 4 to FIG. 6), and includes at least one socket terminal. The second electrically connecting component M1 is a plug-type terminal structure and includes at least one plug-type terminal. The first electrically connecting component U1 includes an electrically conductive main body 31. The electrically conductive main body 31 includes the connecting portion 311 and the first through hole 312, and the connecting portion 311 is disposed on one side wall of the electrically conductive main body 31. The second terminal 222 of the wire main body 22 is fixed on the connecting portion 311 (as shown in FIG. 2 and FIG. 3). In addition, the first electrically connecting component U1 further includes a second electrical insulator 32 and a crown spring 33, and the electrically conductive main body 31 and the crown spring 33 are disposed inside the second electrical insulator 32.

The connecting portion 311 extends in a direction perpendicular to a direction in which the first through hole 312 extends, and the connecting portion 311 is a structure having a connection surface. The connecting portion 311 has a thickness that ranges from 0.5 mm to 4.0 mm. Accordingly, the current transmission assembly U having the electrically connecting component 3 is capable of carrying a current of 100 A or more. For example, in the present embodiment, the second terminal 222 of the wire main body 22 is fixed to the connecting portion 311 by ultrasonic welding, and the first terminal 221 of the wire main body 22 is fixed on the connecting member 13 of the pluggable component 1 by ultrasonic welding.

Therefore, the circuit board structure M is connected to the first electrically connecting component U1 through inserting the at least one plug-type terminal of the second electrically connecting component M1 into the first through hole 312, so that the first electrically connecting component U1 is electrically connected to the circuit board structure M.

However, in another embodiment (not shown in the figures), a configuration of the first electrically connecting component U1 and a configuration of the second electrically connecting component M1 can also be swapped. That is to say, the first electrically connecting component U1 disposed on the current transmission assembly U is the plug-type terminal structure, and includes at least one plug-type terminal having the connecting portion. The second electrically connecting component M1 disposed on the circuit board structure M is the socket terminal structure, and includes at least one socket terminal. Therefore, whether the first electrically connecting component U1 is the socket terminal structure and the second electrically connecting component M1 is the plug-type terminal structure, or the first electrically connecting component U1 is the plug-type terminal structure and the second electrically connecting component M1 is the socket terminal structure, such that the structures according to the present disclosure can be designed to increase a current carrying capacity.

Beneficial Effects of the Embodiments

In conclusion, one of the beneficial effects of the present disclosure is that the current carrying capacity of the current transmission assembly U provided by the present disclosure can be increased, by virtue of "the electrically conductive main body 31 of the electrically connecting component 3 including the connecting portion 311 and the first through hole 312, the connecting portion 311 being disposed on the side wall of the electrically conductive main body 31, and the second terminal 222 of the wire main body 22 being fixed to the connecting portion 311".

Another one of the beneficial effects of the present disclosure is that, the current carrying capacity of the current transmission system S provided by the present disclosure can be increased by virtue of "one of each of the first electrically connecting components U1 and each of the second electrically connecting components M1 including the electrically conductive main body 31, the electrically conductive main body 31 including the connecting portion 311 and the first through hole 312, the second terminal 222 of the wire main body 22 being fixed to the connecting portion 311, and another one of each of the first electrically connecting components U1 and each of the second electrically connecting components M1 including at least one plug-type terminal".

Furthermore, in the present disclosure provided herein, the current transmission assembly U of the electrically connecting component 3 is capable of carrying the current of 100 A or more, by virtue of "the connecting portion 311 having the thickness that ranges from 0.5 mm to 4.0 mm".

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A current transmission assembly, comprising:

a pluggable component including a housing, at least one set of electrically conductive arms, and at least one connecting member, the at least one set of electrically conductive arms being disposed inside the housing and having two contact terminals arranged opposite to each other to form an interface, and the at least one connecting member being electrically connected to at least one of the two contact terminals;

at least one conductor component including a first electrical insulator and a wire main body, the wire main body including a plurality of electrically conductive fibers, wherein the first electrical insulator encircles the wire main body, a first terminal and a second terminal of the wire main body are exposed from the wire main body, and the first terminal is connected to the at least one connecting member; and at least one electrically connecting component including an electrically conductive main body and a second electrical insulator, second electrical insulator having a chamber therein, at least one part of the electrically conductive main body being inserted and fixed in the chamber of the second electrical insulator, wherein the electrically conductive main body including a connecting portion and a first through hole, the second electrical insulator has a second through hole corresponding to the first through hole, and the second terminal of the wire main body is fixed on the connecting portion.

2. The current transmission assembly according to claim 1, wherein the connecting portion is a plate-like structure that extends perpendicular to a side wall of the electrically conductive main body.

3. The current transmission assembly according to claim 2, wherein the second terminal of the wire main body is fixed to the connecting portion by ultrasonic welding or by soldering.

4. The current transmission assembly according to claim 1, wherein each of the at least one electrically connecting component further includes a crown spring, the crown spring passes through the first through hole and is disposed inside the electrically conductive main body.

5. The current transmission assembly according to claim 1, wherein the crown spring includes a plurality of first cantilevers and a plurality of second cantilevers, and the plurality of first cantilevers extend in a direction opposite to a direction in which the plurality of second cantilevers extend.

6. The current transmission assembly according to claim 1, wherein the at least one set of electrically conductive arms further includes a pressing elastic assembly, the pressing elastic assembly includes two resilient tabs that are arranged oppositely, and the two contact terminals are disposed between the two resilient tabs.

7. A current transmission system, comprising:

a pluggable component including a housing, at least one set of electrically conductive arms, and at least one connecting member, the at least one set of electrically conductive arms being disposed inside the housing and having two contact terminals arranged opposite to each other to form an interface, and the at least one connecting member being electrically connected to at least one of the two contact terminals;

at least one conductor component including a first electrical insulator and a wire main body, the wire main body including a plurality of electrically conductive fibers, wherein the first electrical insulator encircles the wire main body, a first terminal and a second terminal of the wire main body are exposed from the wire main body, and the first terminal is connected to the at least one connecting member;

at least one first electrically connecting component being connected to the second terminal of the wire main body, wherein each of the first electrically connecting component includes an electrically conductive main body, and the electrically conductive main body includes a connecting portion and a first through hole; and at least one second electrically connecting component being electrically connected to a circuit board structure, the at least one second electrically connecting components including a plug-type terminal being detachably connected to the electrically conductive main body;

wherein the at least one first electrically connecting components further includes a second electrical insulator, the second electrical insulator has a chamber therein and a second through hole, the second through hole being communicated with the chamber and corresponding to the first through hole, and the plug-type terminal is inserted in the electrically conductive main body through the first through hole and the second through hole for electrically connected with each other.

8. The current transmission system according to claim 7, wherein the connecting portion is a plate-like structure that extends perpendicular to a side wall of the electrically conductive main body.

9. The current transmission system according to claim 7, wherein the second terminal of the wire main body is fixed to the connecting portion by ultrasonic welding.

10. The current transmission system according to claim 7, wherein the at least one first electrically connecting components further includes a crown spring, the crown spring passes through the first through hole and is disposed inside the electrically conductive main body.

11. The current transmission system according to claim 10, wherein the crown spring includes a plurality of first cantilevers and a plurality of second cantilevers, and the plurality of first cantilevers extend in a direction opposite to a direction in which the plurality of second cantilevers extend.

* * * * *